No. 778,025. Patented December 20, 1904.

UNITED STATES PATENT OFFICE.

RICARDO FORTUN AND EDUARDO SEMPRUN, OF MADRID, SPAIN.

SOLDER FOR ALUMINIUM OR ALUMINIUM ALLOYS.

SPECIFICATION forming part of Letters Patent No. 778,025, dated December 20, 1904.

Application filed July 2, 1904. Serial No. 215,100.

*To all whom it may concern:*

Be it known that we, RICARDO FORTUN and EDUARDO SEMPRUN, subjects of the King of Spain, residing in Madrid, Spain, have jointly invented certain new and useful Improvements in Solder for Aluminium or Aluminium Alloys, of which the following is a specification.

This invention relates to certain improvements introduced in our solder for aluminium or aluminium alloys which is described in our United States Patent No. 736,712, of 1903.

We have found that in order to obtain an absolutely perfect and industrially profitable solder of aluminium or aluminium alloys it is necessary to, first of all, phosphorate by means of a preliminary operation the silver, the aluminium, and the tin, and to sulfurate the zinc, these being the metals we have definitely adopted in the manufacture of our solder. This phosphorization and sulfuration of the metals is effected in the following manner, the proportions in each operation being definite and invariable: Two grams of chemically-pure silver, six grams of aluminium, and ten grams of tin are heated together in a porcelain test-crucible fitted with a lid, one after the other in the order named, over a muffle-furnace to fusion-point, the resulting molten mass being kept continually stirred until the various metals in fusion are all more or less intimately mixed together. The mass is then allowed to cool, after which it is submitted to a fresh fusion and freed from slags is cast in the shape of rails. A larger or smaller quantity of this first alloy being thus obtained its phosphorization is effected by again melting it in the porcelain crucible and allowing the molten mass when in complete fusion to gradually cool and adding just before solidification takes place a piece of live phosphorus of about ten per cent. of the total weight of the mass and immediately closing the lid. We propose to designate this alloy of silver, aluminium, and tin thus phosphorated "metal F" when technically referring thereto in future. The sulfuration of the zinc is now proceeded with in the following manner: In a bar-crucible and on an open fire a suitable quantity of zinc is melted, and when the metal is in complete fusion small pieces of sulfur are from time to time thrown in, the mass of metal in the meantime being kept continually stirred. This operation may be considered as terminated when after the impurities of the metal have been removed by skimming there remains a blackish-brown powder of sulfid of zinc, which may be gathered from the surface of the metal and which on being examined by means of the Roentgen rays will be found to present an intensely phosphorescent appearance. The zinc is next cast in rails, which we will call "metal S." We next proceed to make an alloy composed of metal F, eighty-five parts, metal S, fifteen parts, which are melted together and the resulting molten mass cast in form of rails, which we will call "metal F S." Our improved solder for aluminium or aluminium alloys therefore is now composed of the following metals in the determined proportions indicated, viz: metal F S, one hundred parts; aluminium, one hundred parts; zinc, eight hundred parts; tin, three thousand two hundred parts, the said metals being melted one after another in the order given and the resulting molten mass cast in molds.

By strictly following the above process an absolutely perfect solder for aluminium or aluminium alloys impervious to the action of time can be obtained. Nevertheless we are not to be understood as limiting the invention in every detail to the specific product disclosed.

What we claim is—

1. The herein-described solder for aluminium or aluminium alloys, including the following ingredients, silver, aluminium, zinc and tin, at least a portion of the silver, aluminium and tin being phosphorized, and at least a portion of the zinc being sulfurated.

2. The herein-described solder for aluminium or aluminium alloys, including the following ingredients in approximately the proportions stated—an alloy composed of silver, aluminium and tin phosphorized and zinc sulfurated, one hundred parts, aluminium, one hundred parts, zinc, eight hundred parts, tin, three thousand two hundred parts.

3. The herein-described solder for aluminium or aluminium alloys, including the following ingredients in approximately the proportions stated—an alloy composed of eighty-five parts of a phosphorized alloy of silver, two parts; aluminium, six parts; and tin, ten parts: and of fifteen parts of sulfid of zinc, one hundred parts, aluminium, one hundred parts; zinc, eight hundred parts, tin, three thousand two hundred parts.

In witness whereof we have hereunto signed our names in the presence of two subscribing witnesses.

RICARDO FORTUN.
    EDUARDO SEMPRUN.

Witnesses:
 MADDIN SUMMERS,
 ENRIQUE ERIGUEROS.